(12) United States Patent
Turney et al.

(10) Patent No.: US 6,499,045 B1
(45) Date of Patent: Dec. 24, 2002

(54) IMPLEMENTATION OF A TWO-DIMENSIONAL WAVELET TRANSFORM

(75) Inventors: Robert D. Turney, Watertown, WI (US); Ali M. Reza, Milwaukee, WI (US)

(73) Assignee: Xilinx, Inc., San Jose, CA (US)

(*) Notice: Subject to any disclaimer, the term of this patent is extended or adjusted under 35 U.S.C. 154(b) by 0 days.

(21) Appl. No.: 09/422,923

(22) Filed: Oct. 21, 1999

(51) Int. Cl.[7] .............................................. G06F 17/14
(52) U.S. Cl. ........................................ 708/401; 708/400
(58) Field of Search ................................... 708/401, 400

(56) References Cited

U.S. PATENT DOCUMENTS

| | | | | |
|---|---|---|---|---|
| 4,760,543 A | * | 7/1988 | Ligtenberg et al. | 708/400 |
| 4,791,598 A | * | 12/1988 | Liou et al. | 708/401 |
| 5,126,962 A | * | 6/1992 | Chiang | 708/401 |
| 5,197,021 A | * | 3/1993 | Cucchi et al. | 708/401 |
| 5,859,788 A | * | 1/1999 | Hou | 708/400 |
| 5,875,122 A | * | 2/1999 | Acharya | 708/407 |
| 5,889,413 A | | 3/1999 | Bauer | 326/40 |
| 5,991,788 A | | 11/1999 | Mintzer | 708/622 |
| 6,038,579 A | * | 3/2000 | Sekine | 708/400 |
| 6,047,303 A | * | 4/2000 | Acharya | 708/407 |
| 6,216,145 B1 | * | 4/2001 | Zandi et al. | 708/400 |
| 6,223,195 B1 | * | 4/2001 | Tonomura | 708/402 |

OTHER PUBLICATIONS

Xilinx, Inc., "The Programmable Logic Data Book", available from Xilinx, Inc., 2100 Logic Drive, San Jose, CA 95124, pp. 3–1 to 3–60, 1999.

* cited by examiner

Primary Examiner—David H. Malzahn
(74) Attorney, Agent, or Firm—LeRoy D. Maunu; Lois D. Cartier

(57) ABSTRACT

Two-dimensional discrete wavelet transform analysis and synthesis banks. In various embodiments, a cascade combination of two one-dimensional wavelet transforms is implemented, along with a set of memory buffers between the two stages. The memory buffers store intermediate results between the stages of the two-dimensional discrete wavelet transform, thereby eliminating off-chip memory references.

34 Claims, 8 Drawing Sheets

(a) Analysis (a) Analysis (b) Synthesis (a) Analysis (b) Synthesis

| Bank of Constant Multipliers = BKCM |
| Post-Add/Subtract Blocks = P-A/SB |
| Bank of Shift Register = BSR |
| Forward Order = F |
| KEY   Reverse Order = R |

(a) Analysis (b) Synthesis

| Half of the Bank of Constant Multipliers = HBKCM |
| Bank of Shift Register = BSR |
| Post-Add/Subtract Blocks = P-A/SB |
| KEY   Pre-Add/Subtract Blocks = P$_{re}$-A/SB |

(a) Analysis

IMPLEMENTATION OF A TWO-DIMENSIONAL WAVELET TRANSFORM

CROSS-REFERENCE TO RELATED PATENT APPLICATION

The present invention is related to the following patent application: "A METHOD FOR CONFIGURING AN FPGA FOR LARGE FFTs AND OTHER VECTOR ROTATION COMPUTATIONS" by Lester Mintzer, having application Ser. No. 08/815,019 and filed on Mar. 14, 1997, issued Nov. 23, 1999 as U.S. Pat. No. 5,991,788, which is assigned to the assignee of the present invention and incorporated herein by reference.

FIELD OF THE INVENTION

The present invention generally relates to discrete wavelet transforms (DWT), and more particularly, to field programmable gate array (FPGA) implementations of DWTs.

BACKGROUND

An example programmable logic device (PLD) is the field programmable gate array (FPGA), first introduced by Xilinx, Inc. in 1985. PLDs such as FPGAs are becoming increasingly popular for use in electronics systems. For example, communications systems employ FPGAs in large measure for their re-programmability. In general, the use of FPGAs continues to grow at a rapid rate because they permit relatively short design cycles, reduce costs through logic consolidation, and offer flexibility in their re-programmability.

Advances in semiconductor process technology are delivering FPGAs having logic densities in the range of a million system gates and having operating speeds in excess of 100 MHz. These powerful devices are capable of and have been used to implement digital signal processing (DSP) algorithms that are inherently parallel and normally require multiple DSP microprocessors in order to meet the high data rates. It is feasible to implement such algorithms on a single FPGA because such devices offer a programmable architecture.

The discrete wavelet transform (DWT) is a useful and efficient signal and image decomposition method with many interesting properties. This transformation, which is similar to the Fourier transform, provides information about the frequency content of signals. However, unlike the Fourier transform, DWT is more natural and fruitful when applied to non-stationary signals, such as speech and images.

The flexibility offered by DWT allows researchers to develop suitable wavelet filters for particular applications. For example, in the compression of fingerprints a particular set of biorthogonal filters, Daubechies biorthogonal spline wavelet filters, has been found to be effective. This flexibility is nonexistent in the discrete-cosine transform for image compression.

The latest standards for image and video compression, JPEG and MPEG, include wavelet transforms as the means for image and video signal decomposition. In addition to efficient image decomposition for compression and coding, wavelet transform is applied to images for filtering and enhancement. The filtering algorithms, generally referred to as denoising, have shown robust and effective performance in the removal of noise from images with minimal side effects (blurring).

In many image processing applications, including compression, denoising, and enhancement, real-time processing of a two-dimensional wavelet transform is required. Flexibility in customizing the wavelet transform with regard to the filters and the structure of the wavelet decomposition tree are also desirable. Most ASIC implementations are developed for specific wavelet filters and/or wavelet decomposition trees, which renders ASIC solutions useless for applications that require different filters and/or different decomposition trees. An apparatus that addresses the aforementioned problems, as well as other related problems, is therefore desirable.

SUMMARY OF THE INVENTION

In various embodiments, analysis and synthesis banks of a two-dimensional discrete wavelet transform are implemented using a cascade combination of two one-dimensional wavelet transforms along with a set of memory buffers between the two stages. The memory buffers store intermediate results between the stages of the two-dimensional discrete wavelet transform, thereby eliminating off-chip memory references.

In one embodiment, a two-dimensional discrete wavelet forward transform analysis bank is provided. The analysis bank includes a circuit arranged to perform a first one-dimensional wavelet transform of rows of input data for a selected wavelet type. A plurality of buffers are arranged for storage of output data from the first one-dimensional wavelet transform. A second circuit is arranged to perform a one-dimensional wavelet transform of columns of input data for the selected wavelet type. In another embodiment, the first transform operates on the columns of data and the second transform operates on the rows of data.

In another embodiment, a two-dimensional discrete wavelet inverse transform synthesis bank is provided. The synthesis bank is constructed as the inverse of the analysis bank.

BRIEF DESCRIPTION OF THE DRAWINGS

Various aspects and advantages of the invention will become apparent upon review of the following detailed description and upon reference to the drawings in which.

DETAILED DESCRIPTION

Recent advances in FPGA technology not only provide a significant increase in resources available for implementing logic, but also furnish a significant amount of flexible internal RAM. The internal RAMs provide the advantage of on-chip storage for storage of intermediate results and eliminate time-consuming external memory access operations. Taking advantage of this increased flexibility, the embodiments described herein are optimized for various wavelet filters and decomposition trees. In this way, the invention provides a designer with increased freedom and flexibility in choosing the order of the decomposition filters and the tree structure.

The various embodiments of the invention use a cascade combination of two one-dimensional wavelet transforms along with a set of memory buffers between the two stages for storage of the intermediate results. The embodiments described herein can be implemented on FPGAs such as the Virtex™ FPGA from Xilinx. (Virtex FPGAs are described in pages 3-1 to 3-60 of "The Programmable Logic Data Book 1999", available from Xilinx, Inc., at 2100 Logic Drive, San Jose, Calif., 95124, which pages are hereby incorporated by reference.) Virtex FPGAs provide enough memory for storage of intermediate results. Thus, external RAM modules are eliminated and the complete two-dimensional (2-D) transform can be implemented on a single chip.

In the following discussion, realization of each stage of the wavelet transform is described first. Then, block diagrams depicting realizations for different representative cases are presented. The representation of each realization with high-level blocks assists in the discussion of the realizations for different tree structures.

Figure 1A:
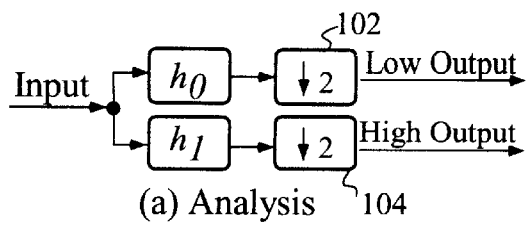
FIGS. 1A and 1B are block diagrams showing realizations of discrete wavelet transform (DWT) analysis and synthesis filter banks.
Figure 1B:
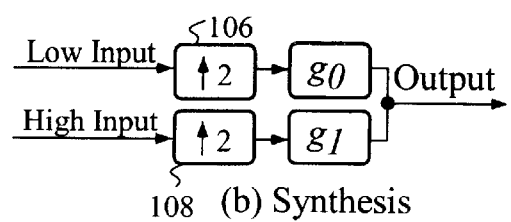

FIGS. 1A and 1B are block diagrams showing realizations of the analysis and synthesis filter banks, respectively, of the discrete wavelet transform (DWT). The forward transform is also called the "analysis" and the inverse transform is also called the "synthesis." For an input signal k, in the forward transform, the two decimating FIR filters are $h_0(k)$ and $h_1(k)$, and in the inverse transform, the two interpolating filters are $g_0(k)$ and $g_1(k)$. In the forward transform, decimator 102 decimates by two (discards every other sample) the low output signal, and decimator 104 decimates the high output signal by 2. In the inverse transform, interpolator 106 interpolates by 2 (inserts a zero between consecutive samples) the low input signal and interpolator 108 interpolates the high output signal by 2.

Perfect reconstruction requires that the output signal from the synthesis block be the same as a delayed and scaled version of the input signal to the analysis block. Based on this desired condition, the analysis and synthesis filters should always satisfy the following two relations:

$$h_1(k)=(-1)^k g_0(k)$$

$$g_1(k)=-(-1)^k h_0(k)$$

In orthogonal wavelet systems, knowledge of scaling filters is sufficient for design of the analysis and synthesis filters. With reference to FIGS. 1A and 1B, for a given even size FIR scaling filter h(k), the following relations hold:

$$g_0(k)=h(k)$$

$$h_0(k)=g_0(K-1-k)$$

$$g_1(k)=-(-1)^k h_0(k)$$

$$h_1(k)=(-1)^k g_0(k)$$

In a biorthogonal wavelet system, in contrast, a pair of scaling filters are used, one for analysis and the other for synthesis. Let h(k) and $\tilde{h}(k)$ represent, respectively, the impulse responses of the synthesis filter and the analysis filter. The perfect reconstruction condition then implies the following:

$$g_0(k)=h(k)$$

$$h_0(k)=\tilde{h}(k)$$

$$g_1(k)=-(-1)^k h_0(k)$$

$$h_1(k)=(-1)^k g_0(k)$$

If both biorthogonal filters are restricted to linear phases, then the lowpass filters, $h_0(k)$ and $g_0(k)$, are symmetric. The highpass filters, $h_1(k)$ and $g_1(k)$, are symmetric when both filters are odd and they are anti-symmetric when both filters are even.

Direct realization of the two building blocks shown in FIGS. 1A and 1B requires that for the analysis filters all computations are carried out for an input rate that is twice the output rate, and for the synthesis filters all computations are carried out for an output rate that is twice the input rate. Realization of the analysis and synthesis filters can be accomplished at a lower rate, in which the output rate is half the input rate, by taking advantage of poly-phase representation of these filters.

Figure 2A:
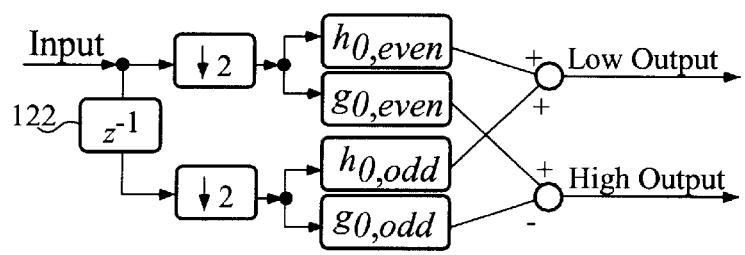
FIGS. 2A and 2B illustrate polyphase realizations of the basic analysis and synthesis building blocks, respectively.
Figure 2B:
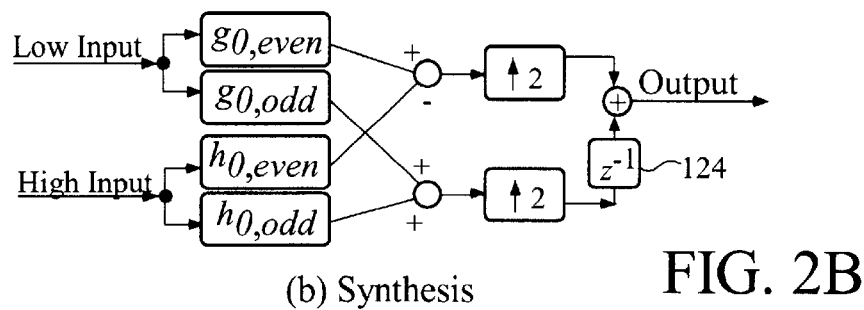

FIGS. 2A and 2B illustrate polyphase realizations of the basic analysis and synthesis building blocks, respectively. In these block diagrams, the subscripts "$_{even}$" and "$_{odd}$" refer respectively to the even and odd indexed coefficients. For example, for the sequence {h(0),h(1),h(2), . . . }, $h_{even}$ and $h_{odd}$ sequences are respectively specified by $h_{even}$={h(0),h(2),h(4), . . . }, and $h_{odd}$={h(1),h(3),h(5), . . . }. The $z^{-1}$ elements 122 and 124 represent delay elements. In this realization, the perfect reconstruction relations, as described above, are also taken into consideration. Both analysis and synthesis building blocks are realized by only using the knowledge of the analysis and the synthesis lowpass filters. In this configuration, all the filtering operations are carried out at the lower rate. To achieve a decimate-by-two low pass function, post-addition of the polyphase even and odd filter functions is necessary (as shown in FIG. 2A). Similarly a post-subtraction is required to achieve the decimate-by-two high pass function.

Figure 3A:
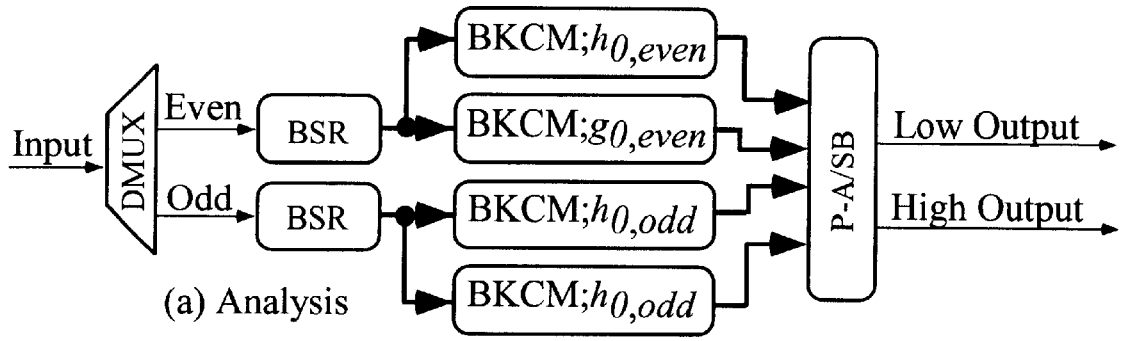
FIGS. 3A and 3B are block diagrams of hardware implementations of the polyphase analysis and synthesis blocks.
Figure 3B:
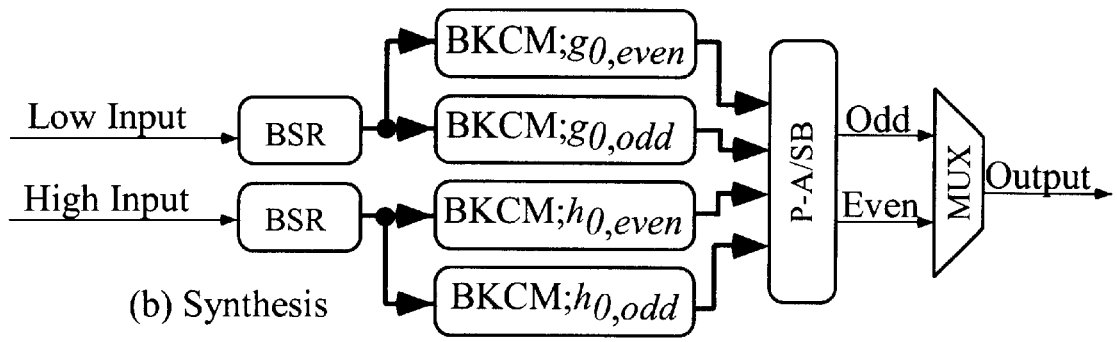

FIGS. 3A and 3B are block diagrams of hardware implementations for the analysis and synthesis blocks of FIGS. 2A and 2B, respectively. The hardware realization of the blocks of FIGS. 2A and 2B is accomplished with banks of registers and multipliers along with the necessary blocks of add/subtract operations. The realizations of FIGS. 3A and 3B combine the various operations in shift registers, multipliers, and post-add/subtract blocks, thereby promoting ease-of-integration for operations of several stages. Banks of shift registers (BSRs) receive the odd and even numbered input samples, and the samples are then provided to the banks of constant multipliers (BKCMs) that are associated with the filters g and h. The post-add/subtract block (P-A/SB) performs the additions or subtractions as indicated by the structure of FIGS. 2A and 2B.

In the case of orthogonal wavelet systems, the two filters, $h_0(k)$ and $g_0(k)$, are related to each other as discussed above. Specifically, the two filter coefficients are the reverse of each other. This property can be exploited to reduce the number of multipliers by half. To implement an orthogonal wavelet system, the order of data presented to the multipliers is reversed and the multipliers must be twice the speed of those depicted in FIGS. 3A and 3B.

Figure 4A:
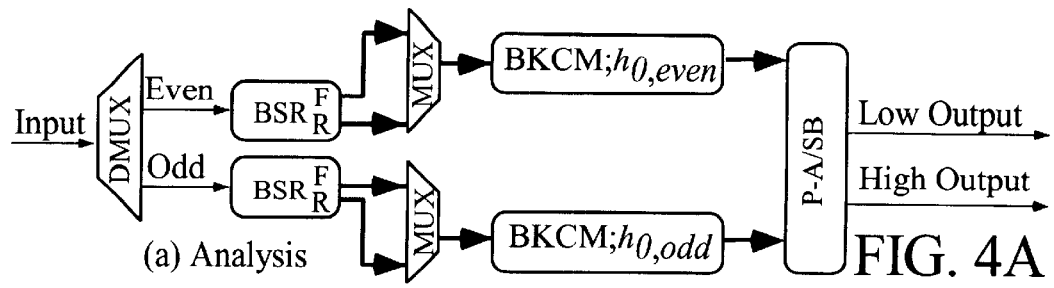
FIGS. 4A and 4B illustrate hardware implementations of the analysis and synthesis blocks for one stage of an orthogonal wavelet transform.
Figure 4B:
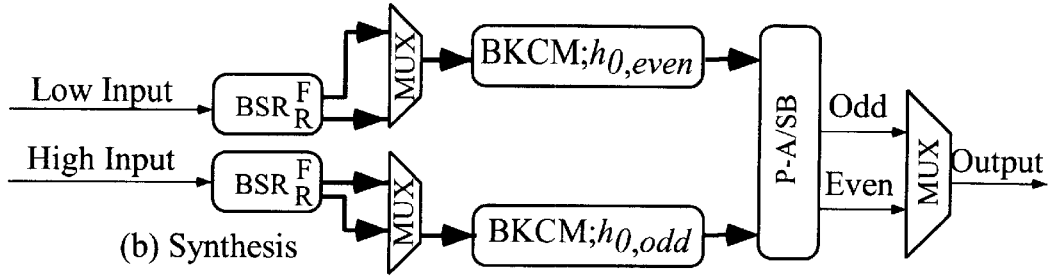

FIGS. 4A and 4B illustrate hardware implementations of the analysis and synthesis blocks for one stage of an orthogonal wavelet transform in accordance with one embodiment of the invention. It will be appreciated that if the required speed for the constant multipliers is unattainable, the implementation of FIGS. 3A and 3B can be used.

Figure 5A:
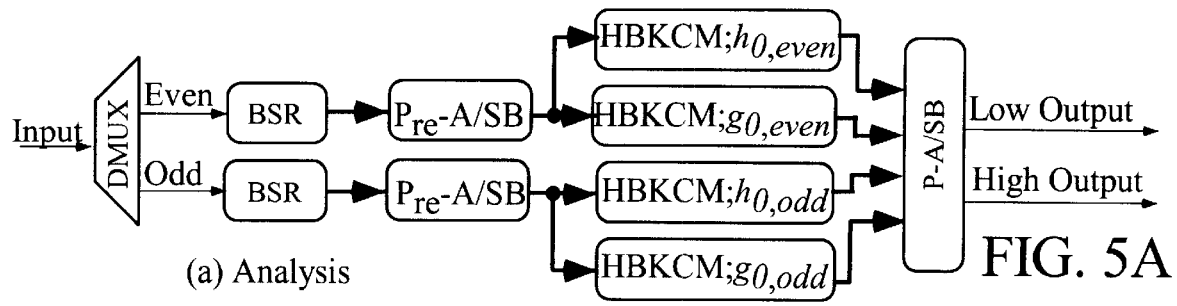
FIGS. 5A and 5B illustrate hardware implementations of the analysis and synthesis blocks for one stage of a biorthogonal wavelet transform.
Figure 5B:
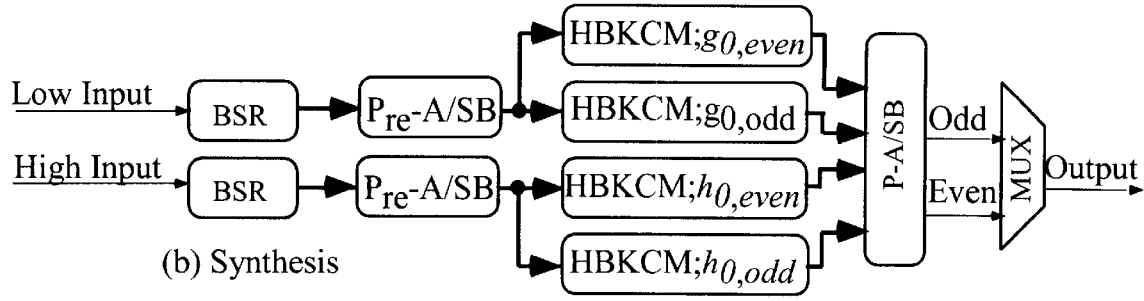

FIGS. 5A and 5B illustrate hardware implementations of the analysis and synthesis blocks for one stage of a biorthogonal wavelet transform in accordance with one embodiment of the invention. In the biorthogonal transform, the filters are generally symmetric and therefore, it is possible to reduce the number of multipliers by half. By using pre-add/subtract blocks, the samples multiplied to the same coefficients are first combined and then delivered to the bank of multipliers. It will be appreciated that the number of multipliers in each bank is equal to the number of distinct coefficients.

Figures 6A, 6B:
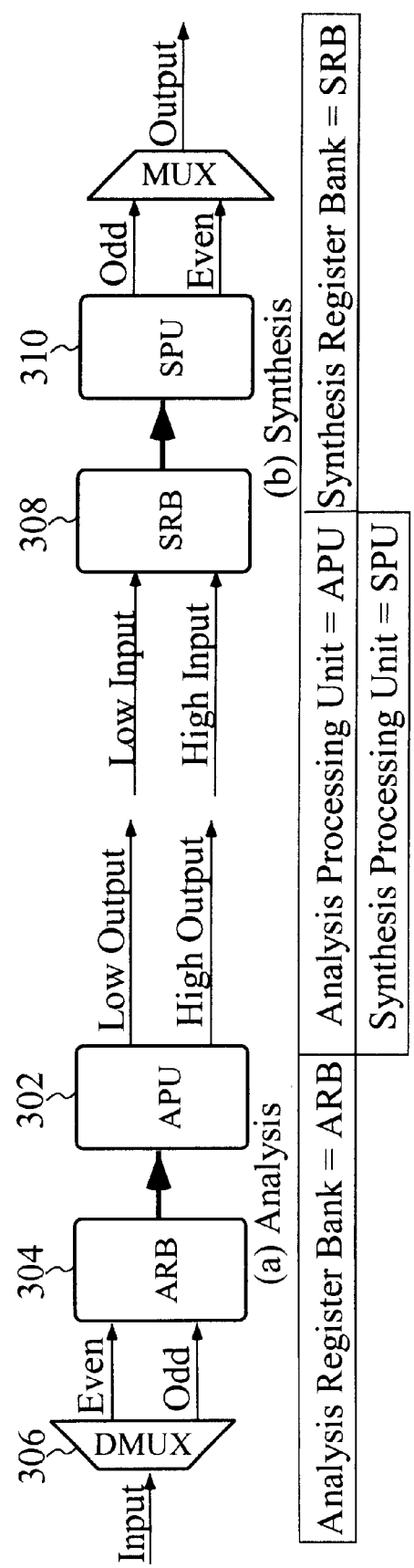
FIGS. 6A and 6B are functional block diagrams of single stages for analysis and synthesis blocks, respectively.

FIGS. 6A and 6B are block diagrams of single stages for analysis and synthesis blocks, respectively, for the DWT. Analysis Processing Unit (APU) 302 represents the banks of multipliers, post-add/subtract blocks, pre-add/subtract blocks, forward/reverse data ordering, and MUXes, for the different embodiments of FIGS. 3A–5A. Analysis Register Bank (ARB) 304 is a set of registers for the even and odd output signals from DMUX 306. Synthesis Register Block 308 is a set of registers for the low and high input signals, and Synthesis Processing Unit 310 includes the appropriate pre-add/subtract blocks, multipliers, post-add/subtract blocks, and MUXes for the different embodiments of FIGS. 3B–5B. Note that for a multi-stage wavelet transform, APU 302 is the same for all stages, as is SPU 310. Details of the internal structure of each block in FIGS. 6A and 6B can be deduced with reference to FIGS. 3A–5B.

In the case of a one-dimensional multi-stage DWT tree (where the lowpass output of each stage is further decomposed to its lowpass and highpass components), it is possible to share the same processing unit block amongst all the stages. With proper scheduling, the processing unit, operating at the input signal rate, has enough time for data processing in all the stages. The processing unit has enough time because the first stage utilizes the processing unit ½ of the time, the second stage utilizes the processing unit ¼ of the time, the third stage utilizes the processing unit ⅛ of the time, and so on. The last two stages use the processing unit with equal shares. Therefore, for an N-stage DWT tree, the processing unit is used for the following fraction of its full rate:

$$2^{-1}+2^{-2}+2^{-3}+ \ldots +2^{-(N-1)}+2^{-(N-1)}=1.$$

It can be seen that with proper utilization of the processing unit, all stages can be processed. However each stage requires a dedicated register bank.

Figure 7A:
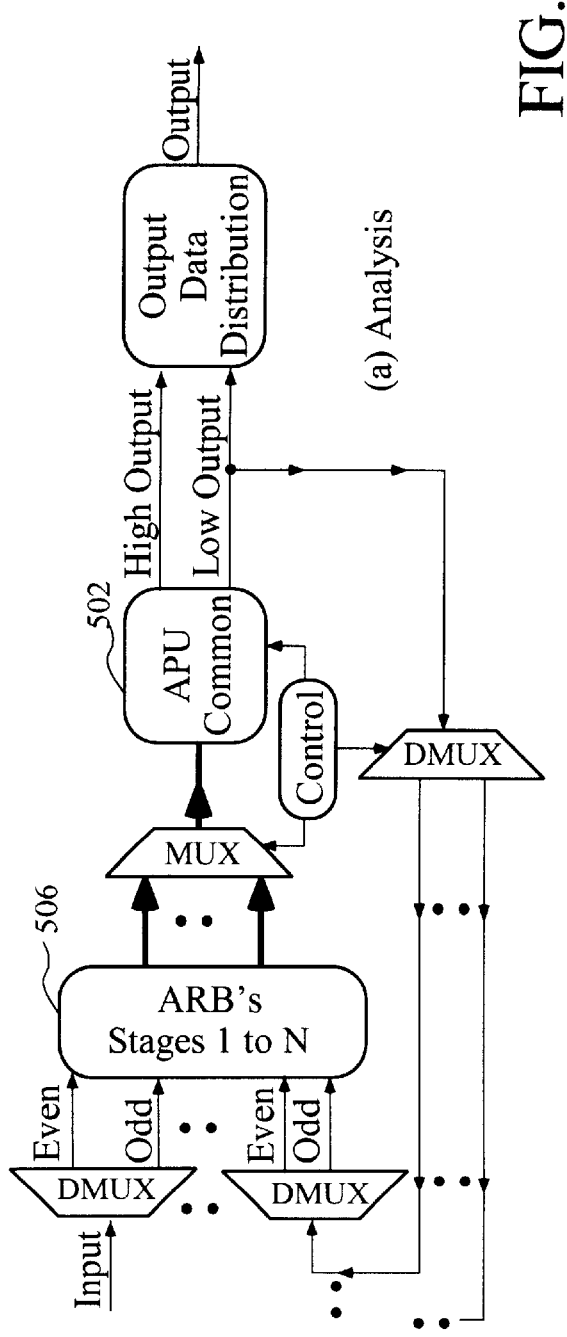
FIGS. 7A and 7B are block diagrams of a one-dimensional DWT for n stages in accordance with one embodiment of the invention.
Figure 7B:
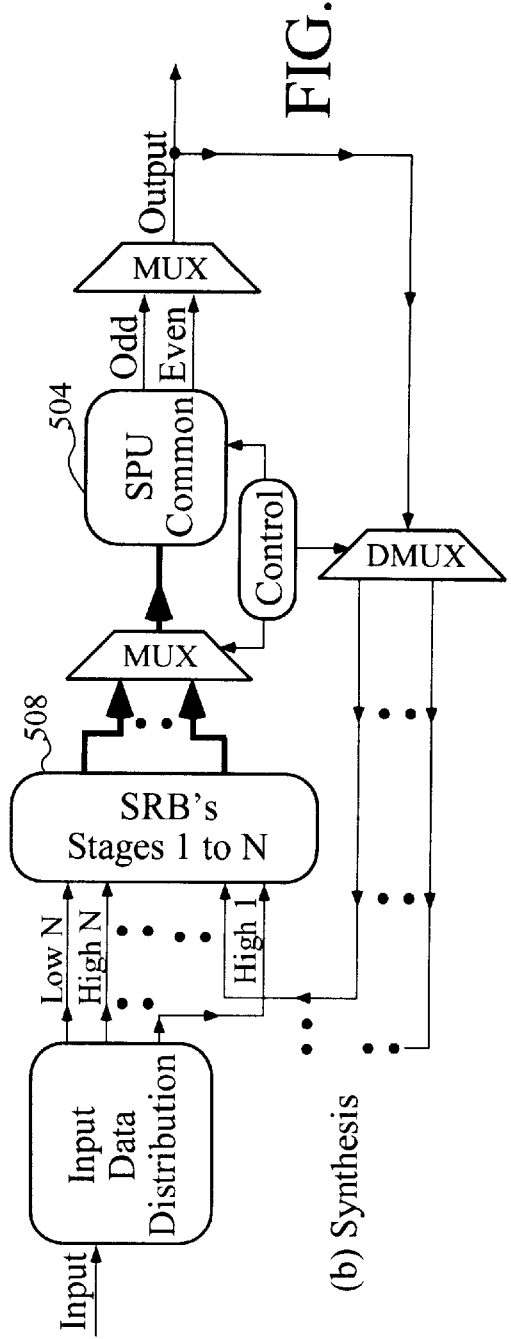

FIGS. 7A and 7B are block diagrams of a one-dimensional DWT for N stages in accordance with an example embodiment of the invention. APU 502 performs the data processing for all the analysis stages, and SPU 504 performs the data processing for all the synthesis stages. For each of the analysis stages, there is dedicated set of registers, which are collectively designated as Analysis Register Banks (ARBs) 506. Similarly, block 508 represents the Synthesis Register Banks (SRBs) for the synthesis stages. As explained in the following paragraphs, the arrangement for the one-dimensional DWT can be used to implement a two-dimensional DWT.

For each stage of the two-dimensional DWT, the process is divided into two steps. The first step is a one-dimensional DWT of each row and the second step is one-dimensional DWT of the columns of the results obtained in the first step. To support the two processing steps, storage is provided for intermediate results of each stage of the decomposition. In general, for each stage, the second step cannot start until its input data, generated by the first step, is available. It will be appreciated that the full binary expansion of the wavelet decomposition tree, known as "wavelet packet," can also be decomposed into two global steps: first multi-stage row processing and then multi-stage column processing. Therefore, in two-dimensional wavelet packet decomposition, there is only one memory access (write and read) after completion of the row processing.

Figure 8A:
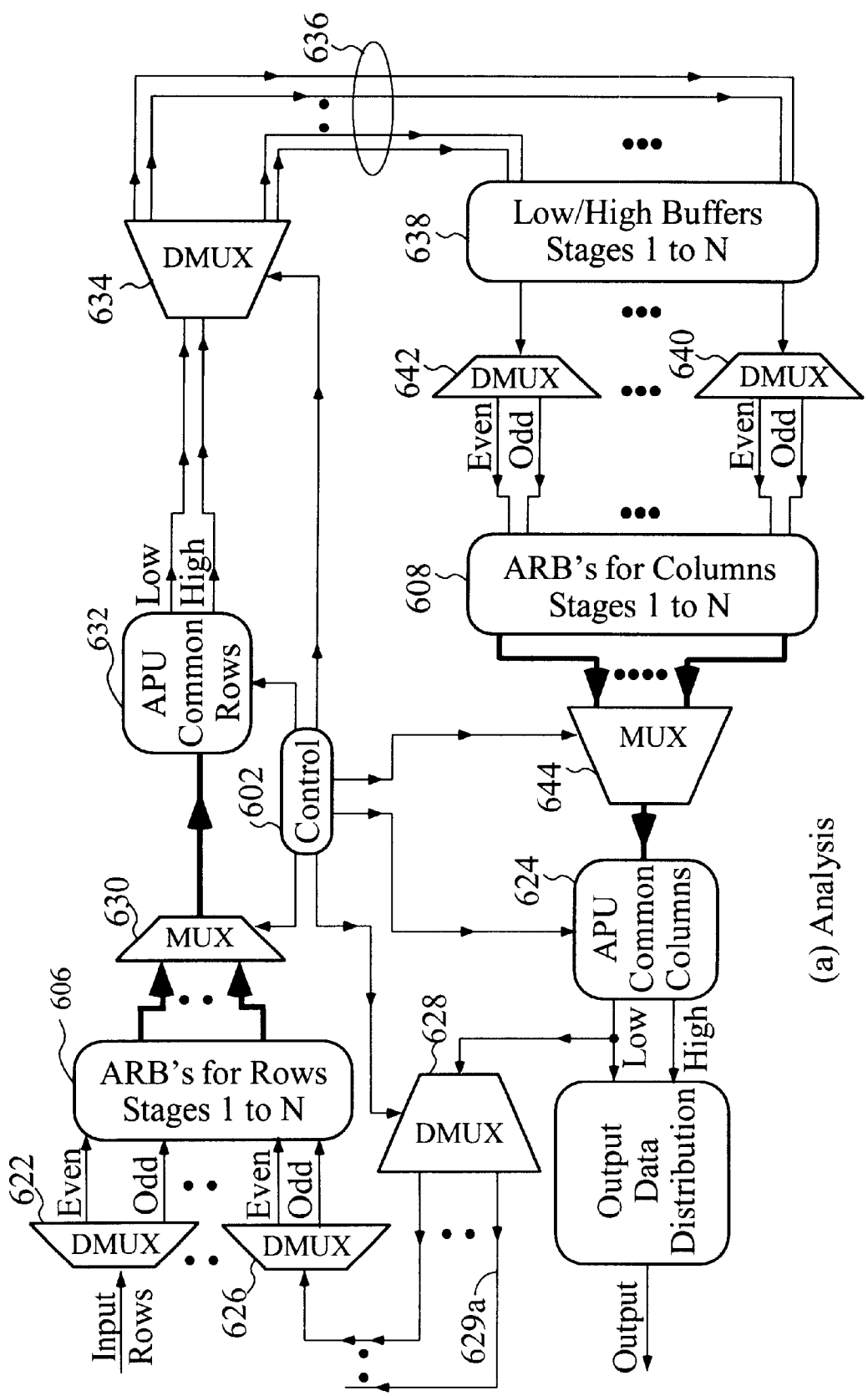
FIGS. 8A and 8B are block diagrams of analysis and synthesis blocks, respectively, for a two-dimensional DWT in accordance with one embodiment of the invention.
Figure 8B:
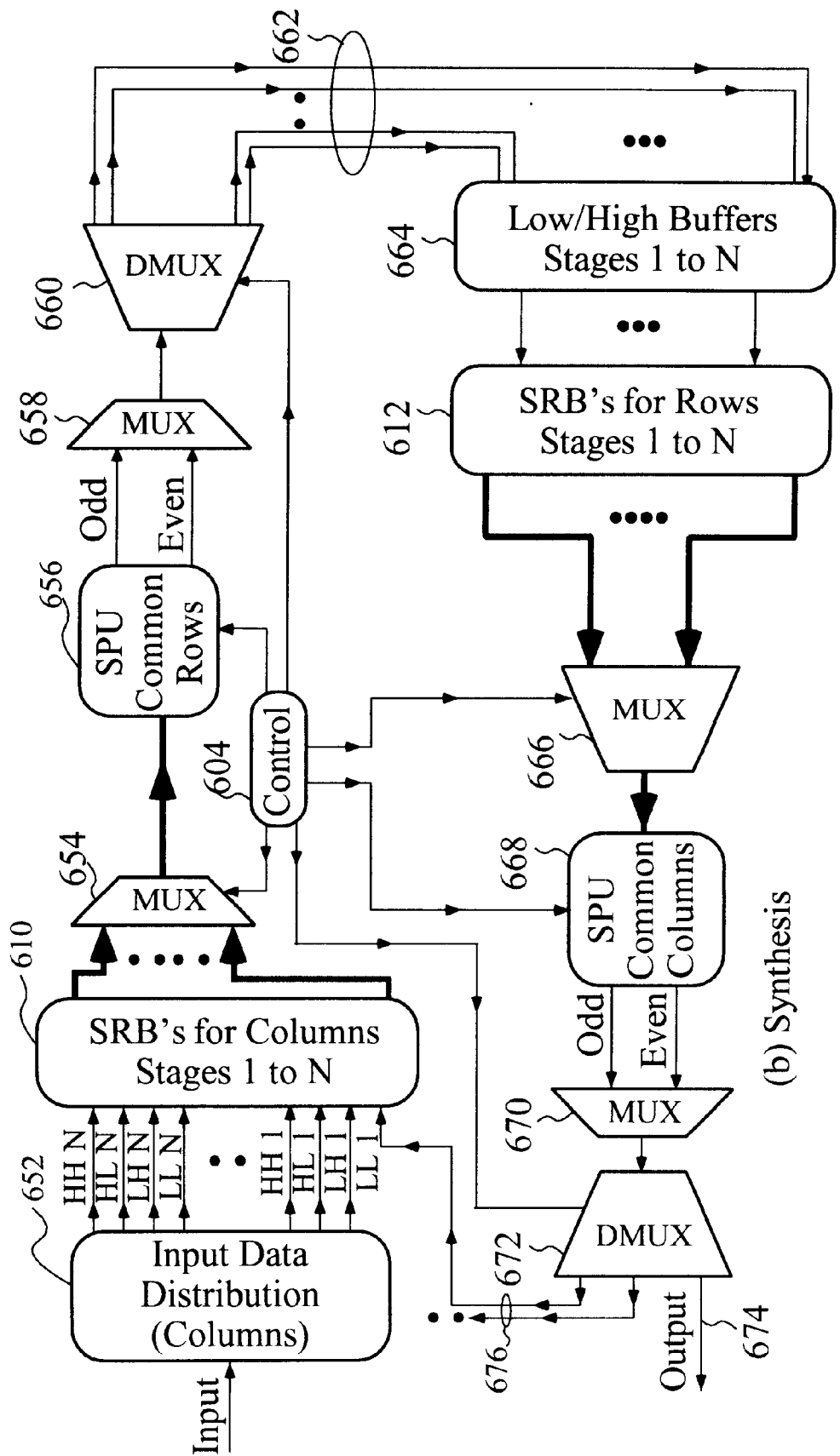

FIGS. 8A and 8B are block diagrams of analysis and synthesis blocks, respectively, for a two-dimensional DWT in accordance with one embodiment of the invention. The two-dimensional DWT is the decomposition tree making the most demands for memory access to intermediate results. With proper usage of internal buffers and proper pipelining, it is possible to avoid external memory access altogether. In this embodiment, the intermediate memory buffers do not need to be as large as the whole image. The buffers are used to collect enough data for the second step processing to start and continue without interruption. Thus, the buffers function as data pipelines.

In the embodiments of FIGS. 8A and 8B, only two sets of processing units are required: the first set for all the stages of the row processing, and the second set for all the stages of the column processing. (In another embodiment, the order of the processing is reversed.) The number of multipliers in each set is equal to the number of different coefficients in the wavelet filters. Control units 602 and 604 schedule processing for the stages of the row and column processing, respectively. Each stage has a dedicated register bank. The collections of register banks are shown collectively as blocks 606 and 608 in FIG. 8A and blocks 610 and 612 in FIG. 8B.

The synthesis arrangement of FIG. 8B processes columns before processing the rows. It will be appreciated that the synthesis arrangement has an initial startup latency that lasts until the pipeline is full of data. The first stage of synthesis requires a distribution of the wavelet coefficients that ensures that the synthesis operation is mathematically correct. One characteristic of the arrangements described herein is the flexibility to adjust the processing speed by choosing a suitable multiplier implementation. For example, the multipliers can be full word-length multipliers or they can be realized using distributed arithmetic implemented on FPGA function generators, as described in co-pending U.S. patent application Ser. No. 08/815,019, referenced above.

Returning to FIG. 8A, each stage of the analysis row manipulation includes a respective demultiplexer (DMUX). Thus, for an n stage DWT, there are n DMUXes for row manipulation. DMUX 622 is dedicated to the first stage and receives the input rows of sample data.

The input data to the other DMUXes is one of the sequences of the low outputs from column processing unit 624. The nth DMUX 626 is shown as receiving a low signal via column DMUX 628. From an input stream of values, each row DMUX, for example 622 and 626, generates even and odd numbered values. In particular, the odd numbered values are the first, third, fifth, etc., and the even numbered values are the second, fourth, sixth, etc.

Output values from DMUXes 622 and 626 are provided to row register banks 606. Row register banks 606 include sets of shift registers that are associated with respective stages of the transform (see FIG. 9). The shift registers introduce the appropriate delays for the stages of the transform.

Output signals from row register banks 606 are provided to stage MUX 630, which selects data from one of the sets of shift registers to be processed by row processing unit 632. Row processing unit 632 provides low and high intermediate results based on the row computations. Row DMUX 634 receives the low and high intermediate results and activates one pair of signal lines 636 for provision to intermediate storage buffers 638. The selected pair of signals lines corresponds to the stage in process.

Figure 10:
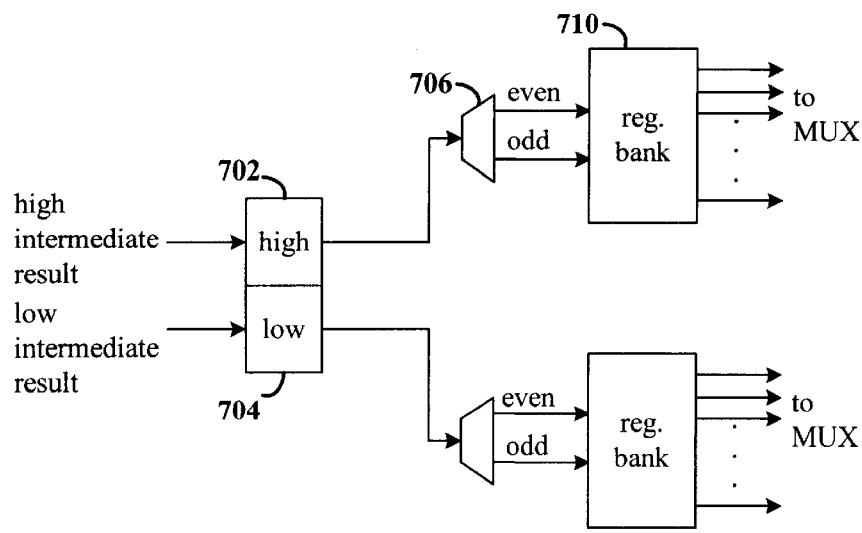
FIG. 10 shows one embodiment of a pair of intermediate storage buffers and associated register banks.

Intermediate storage buffers 638 include a pair of buffers for each of the n stages (see FIG. 10). Each stage has a buffer for storage of high intermediate results and a buffer for storage of low intermediate results. Each buffer provides data to an associated column DMUX. For example, the buffer for the low intermediate results of the first stage provides data to column DMUX 640, and the buffer for the high intermediate results of the last stage provides data to column DMUX 642. Each of the column DMUXes activates one of the even or odd signal lines in accordance with whether the value in the buffer is an even numbered intermediate result or an odd numbered intermediate result.

The column DMUXes, for example 640 and 642, provide values to column register banks 608. As with row register banks 606, column register banks 608 comprise sets of shift registers that are associated with respective stages of the transform. The shift registers introduce the appropriate delays for the stages of the transform.

Column MUX 644 receives data from column register banks 608 and selects one value for provision to column processing unit 624 in accordance with the appropriate stage of processing. Column processing unit 624 performs the column computations on the input values and provides high and low output values for output distribution. The low values are provided to DMUX 628, which feeds back the low values to the appropriate one of the input DMUXes, for example 626, according to the stage of processing. As recognized by those skilled in the art of wavelet transforms, the sequence of data produced by DMUX 628 is as follows. A first output terminal (e.g., 629a) from DMUX 628 is active every other cycle, a second output terminal (not shown) from DMUX 628 is active every fourth cycle, a third output terminal is active every eighth cycle, . . . , and the $n^{th}$ output terminal is active every $2^n$ cycles.

Turning now to FIG. 8B, where a synthesis arrangement for a two-dimensional DWT is illustrated, input values are provided in a predetermined order to data distribution element 652. It will be appreciated that the number of synthesis stages corresponds to the number of analysis stages, which is a design choice. "HH" refers to high pass filtering in the row and column direction, "HL" refers to high pass filtering in the row direction and low pass filtering in the column direction, "LH" refers to low pass filtering in the row direction and high pass filtering in the column direction, and "LL" refers to low pass filtering in both the row and column directions, as understood by those skilled in the art of two-dimensional DWT processing. Data distribution block 652 provides 4 output busses (HH, HL, LH, and LL) for each of the stages 1—n, and each output bus is associated with a register bank of block 610. Note that each of busses HH, HL, LH, and LL includes two signal lines, one for even numbered values and one for odd numbered values.

Output signals from synthesis column register banks 610 are provided to column MUX 654, which selects a value for provision to synthesis processing unit 656 in accordance with the stage of processing. Based on an input stream of values, synthesis processing unit 656 produces an output stream of intermediate results, with odd and even numbered values being provided on separate signal lines to MUX 658 as shown. Output signals from MUX 658 are provided to DMUX 660, which activates one of signal lines 662 based on the stage of processing.

The intermediate results are stored in pairs of buffers that are associated with the respective stages. One buffer in each pair is arranged for storage of a high intermediate result, and the second buffer in the pair is arranged for storage of a low intermediate result. The buffers are shown as block 664. Both buffers in the buffer pair provide data to a single set of shift registers. The sets of shift registers for the n stages comprise synthesis register banks 612.

Data from register banks 612 are provided to MUX 666, which selects an input signal for synthesis row processing unit 668. Based on an input stream of values, synthesis processing unit 668 produces an output stream of final results, with odd and even numbered values being provided on separate signal lines to MUX 670 as shown. MUX 670 alternately selects the odd and even numbered final results for provision to DMUX 762. DMUX 672 activates signal line 674 for all input values, and in addition, activates one of signal lines 676 for feedback into one of the synthesis register banks (block 610) associated with the LL input busses for stages 1–(n–1). The sequencing for activating the output terminals of DMUX 672 for feedback to column register banks 610 is similar to that described above for DMUX 628 in FIG. 8A.

It will be appreciated that between buffers 664 and register banks 612 of the synthesis bank of FIG. 8B, DMUXes that function the same as DMUXes 640 and 642 in the analysis bank of FIG. 8A are required (but not shown).

Figure 9:
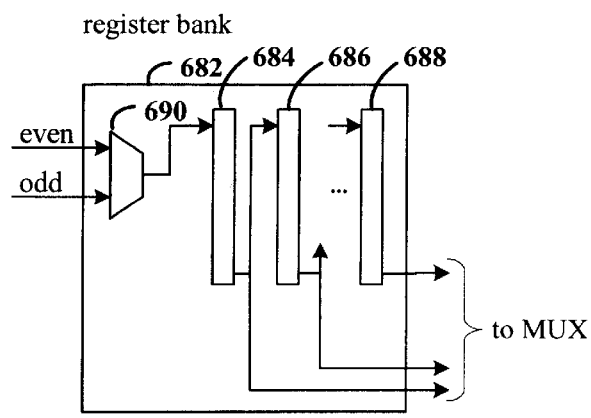
FIG. 9 illustrates one embodiment of a register bank.

FIG. 9 illustrates one embodiment of a register bank that is suitable for the analysis and synthesis blocks described above. Relative to the analysis block of FIG. 8A, there are respective register banks associated with the input DMUX 622 and the feedback DMUXes, e.g., 626.

Register bank 682 includes a selected number of shift registers 684, 686, and 688 that can be implemented, for example, using function generators of an FPGA, such as those described by Bauer in U.S. Pat. No. 5,889,413, which is hereby incorporated by reference. The input terminal of shift register 684 is coupled to the output terminal of MUX 690, which selects between the even and odd input signals. The output signals from shift registers 684, 686, and 688 are tapped and provided as output signals by register bank 682. In the case of an analysis block (FIG. 8A), output signals from a row register bank are provided to row MUX 630. For a synthesis block, the register bank output signals are provided to MUX 654 (FIG. 8B). It will be appreciated that the number of tapped delays is dependent on the chosen length of the wavelet filter. Since the type of wavelet varies for different applications, and the filter length varies by type of wavelet, the length varies depending on the application.

FIG. 10 shows one embodiment of a pair of intermediate storage buffers and associated register banks for one stage of input signals. The embodiment of FIG. 10 is suitable for both the analysis and synthesis blocks of FIGS. 8A and 8B. Buffer 702 provides storage for high intermediate results, and buffer 704 provides storage for low intermediate results. The low and high results provided by processing unit 632 (FIG. 8A) in the analysis block and by processing unit 656 in the synthesis block (FIG. 8B). In one embodiment, the buffers are implemented with parallel registers on an FPGA.

Each buffer 702 and 704 provides input signals to a DMUX for separating the even numbered from the odd numbered samples and providing the samples to the associated register bank. For example, DMUX 706 separates even numbered and odd numbered high output signals for provision to register bank 710. Each of register banks 710 and 712 is implemented in the manner described for register bank 682 of FIG. 9.

An arrangement such as that illustrated in a portion of the structure of FIG. 10 can be used to implement the synthesis column register banks 610 (FIG. 8B). Specifically, arrangements including DMUXes (e.g., 706) and register banks (e.g., 710) can be coupled to the respective output terminals of data distribution element 652. Each of the 4 possible output busses (HH, HL, LH, and LL) in each of the n stages drives a respective DMUX (e.g., 706) that is coupled to a register bank (e.g., 710).

Figure 11:
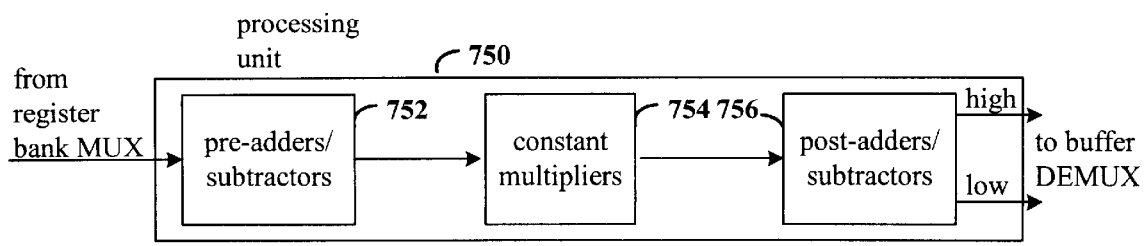
FIG. 11 is a functional block diagram of a processing unit.

FIG. 11 is a functional block diagram of a processing unit 750 in accordance with one embodiment of the present invention. The implementation of processing unit 750 is suitable for both analysis processing units (632 and 624, FIG. 8A) and synthesis processing units (656 and 668, FIG. 8B). In another embodiment, the same APU is time-shared between the row and column processing.

Input signals to processing unit 750 are provided by a register bank MUX (e.g., 630, 644, 654, or 666). Processing unit 750 includes pre-adder/subtractor unit 752, a bank of constant multipliers 754, and post-adder/subtractor unit 756. Pre-adders/subtractors 752 and constant multipliers 754 implement a symmetrical finite impulse response filter (FIR) in CLBs of an FPGA as recognized by those skilled in art.

Post-adders/subtractors 756 are provided, as necessary, for implementation of the polyphase realizations of the analysis and synthesis blocks illustrated in FIGS. 2A and 2B.

A new approach for implementation of the two-dimensional DWT has been described. By taking advantage of FPGA-implemented memory elements, the complete process can be implemented on a single FGPA chip. The embodiments described herein eliminate the need for outside memory for storage of intermediate results. The overall approach described herein provides design flexibility in terms of choice of a particular wavelet transform. With proper adjustment of the scheduling between different stages, the implementation can be extended to any desired customized decomposition tree.

The present invention is applicable to a variety of programmable and non-programmable logic devices and has been found to be particularly applicable and beneficial in Xilinx FPGAs. While the present invention is not so limited, an appreciation of the present invention has been provided by way of specific examples involving FPGAs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A two-dimensional discrete wavelet forward transform analysis bank, comprising:
   a first circuit configured and arranged to perform a first one-dimensional wavelet transform in a first dimension of a multi-dimensional data set for a selected wavelet type;
   a plurality of buffers arranged for storage of output data from the first circuit; and
   a second circuit coupled to the plurality of buffers, the second circuit being configured and arranged to perform a second one-dimensional wavelet transform in a second dimension of the data set for the selected wavelet type,
   wherein the forward transform includes n stages and wherein:
      the second circuit is configured and arranged to generate n high and n low outputs; and
      the first circuit is configured and arranged to receive low outputs 1 through (n−1) from the second circuit.

2. The analysis bank of claim 1, wherein the data set is two dimensional.

3. The analysis bank of claim 2, wherein the first dimension includes rows, and the second dimension includes columns.

4. The analysis bank of claim 2, wherein the first dimension includes columns, and the second dimension includes rows.

5. The analysis bank of claim 1, wherein the selected wavelet type is orthogonal.

6. The analysis bank of claim 1, wherein the selected wavelet type is biorthogonal.

7. The analysis bank of claim 1, further comprising:
   the first circuit is configured and arranged to generate n high and n low outputs; and
   the buffers include n pairs of buffers, each pair of buffers including storage for a high output signal and a low output signal from the first circuit.

8. A two-dimensional discrete wavelet inverse transform synthesis bank, comprising:
   a first circuit configured and arranged to perform a first one-dimensional wavelet inverse transform in a first dimension of a multi-dimensional data set for a selected wavelet type;
   a plurality of buffers, the buffers arranged for storage of output data from the first circuit; and
   a second circuit coupled to the plurality of buffers, the second circuit being configured and arranged to perform a second one-dimensional wavelet inverse transform in a second dimension of the data set for the selected wavelet type,
   wherein the forward transform includes n stages and wherein:
      the second circuit is configured and arranged to generate n high and n low outputs; and
      first circuit is configured and arranged to receive low outputs 1 through (n−1) from the second circuit.

9. The synthesis bank of claim 8, wherein the data set is two dimensional.

10. The synthesis bank of claim 9, wherein the first dimension includes rows, and the second dimension includes columns.

11. The synthesis bank of claim 9, wherein the first dimension includes columns, and the second dimension includes rows.

12. The synthesis bank of claim 8, wherein the selected wavelet type is orthogonal.

13. The synthesis bank of claim 8, wherein the selected wavelet type is biorthogonal.

14. The synthesis bank of claim 8, wherein:
   the first circuit is configured and arranged to generate n high and n low outputs; and
   the buffers include n pairs of buffers, each pair of buffers including storage for a high output signal and a low output signal from the first circuit.

15. A two-dimensional discrete wavelet forward transform analysis bank, comprising:
   a first plurality of register banks respectively associated with stages of the forward transform, one of the first plurality of register banks being arranged for storage of input data in a first dimension in a multi-dimensional data set and others of the first plurality of register banks being arranged for storage of feedback data;

a first processing unit coupled to the first plurality of banks, the first processing unit being configured and arranged to perform a first discrete wavelet forward transform for a selected wavelet type;

a plurality of intermediate storage buffers coupled to the first processing unit, each buffer being associated with a respective stage of the first forward transform and arranged for storage of intermediate results;

a second plurality of register banks coupled to the intermediate storage buffers, each of the second plurality of register banks being arranged for storage of the intermediate results and respectively associated with one stage of the second forward transform;

a second processing unit coupled to the second plurality of register banks and to selected ones of the first plurality of register banks, the second processing unit being configured and arranged to perform a second discrete wavelet forward transform in a second dimension for the selected wavelet type; and a control unit coupled to the first and second processing units, to the first and second plurality of register banks, and to the intermediate storage buffers, the control unit being arranged to select data from the first and second pluralities of register banks and the intermediate storage buffers in accordance with the selected wavelet type.

16. The analysis bank of claim 15, wherein the data set is two dimensional.

17. The analysis bank of claim 16, wherein the first dimension includes rows, and the second dimension includes columns.

18. The analysis bank of claim 16, wherein the first dimension includes columns, and the second dimension includes rows.

19. The analysis bank of claim 15, wherein the selected wavelet type is orthogonal.

20. The analysis bank of claim 15, wherein the selected wavelet type is biorthogonal.

21. The analysis bank of claim 15, wherein each of the first and second register banks includes a plurality of shift registers coupled in a chain, and each shift register includes an output tap for an associated register bank.

22. The analysis bank of claim 21, wherein each of the first and second register banks includes a multiplexer coupled to receive and select between odd and even numbered input signals for provision to a shift register in the register bank.

23. The analysis bank of claim 15, wherein the first and second processing units each comprise:

a plurality of pre-adders and pre-subtractors coupled to a plurality of constant multipliers, the pre-adders, pre-subtractors, and constant multipliers being arranged to implement a symmetric finite impulse response filter; and a plurality of post-adders and post-subtractors coupled to output terminals of the constant multipliers, the post-adders and post-subtractors being arranged to implement a polyphase discrete wavelet forward transform.

24. The analysis bank of claim 15, wherein the forward transform has n stages and wherein:

the second processing unit is configured and arranged to generate high and low outputs;

the first plurality of register banks includes n register banks, wherein register banks 1 through (n-1) of the first plurality of register banks are coupled to receive low output signals from the second processing unit; and register bank n of the first plurality of register banks is arranged to receive the input data.

25. A two-dimensional discrete wavelet inverse transform synthesis bank, comprising:

a first plurality of register banks respectively associated with stages of the inverse transform, one of the first plurality of register banks being arranged for storage of input data in a first dimension in a multi-dimensional data set and others of the first plurality of register banks arranged for storage of feedback data;

a first processing unit coupled to the first plurality of banks, the first processing unit being configured and arranged to perform a first discrete wavelet inverse transform for a selected wavelet type;

a plurality of intermediate storage buffers coupled to the first processing unit, each buffer being associated with a respective stage of the first inverse transform and arranged for storage of intermediate results;

a second plurality of register banks coupled to the intermediate storage buffers, each of the second plurality of register banks being arranged for storage of the intermediate results and respectively associated with one stage of the second inverse transform;

a second processing unit coupled to the second plurality of register banks and to selected ones of the first plurality of register banks, the second processing unit being arranged to perform a second discrete wavelet inverse transform in a second dimension for the selected wavelet type; and a control unit coupled to the first and second processing units, to the first and second plurality of register banks, and to the intermediate storage buffers, the control unit being arranged to select data from the first and second pluralities of register banks and the intermediate storage buffers in accordance with the selected wavelet type.

26. The synthesis bank of claim 25, wherein the data set is two dimensional.

27. The synthesis bank of claim 26, wherein the first dimension includes rows, and the second dimension includes columns.

28. The synthesis bank of claim 26, wherein the first dimension includes columns, and the second dimension includes rows.

29. The synthesis bank of claim 25, wherein the selected wavelet type is orthogonal.

30. The synthesis bank of claim 25, wherein the selected wavelet type is biorthogonal.

31. The synthesis bank of claim 25, wherein each of the first and second register banks includes a plurality of shift registers coupled in a chain, and each shift register includes an output tap for an associated register bank.

32. The synthesis bank of claim 31, wherein each of the first and second register banks includes a multiplexer coupled to receive and select between odd and even numbered input signals for provision to a shift register in the register bank.

33. The synthesis bank of claim 25, wherein the first and second processing units each comprise:

a plurality of pre-adders and pre-subtractors coupled to a plurality of constant multipliers, the pre-adders, pre-subtractors, and constant multipliers being arranged to implement a symmetric finite impulse response filter; and a plurality of post-adders and post-subtractors coupled to output terminals of the constant multipliers, the post-adders and post-subtractors being arranged to implement a polyphase discrete wavelet inverse transform.

34. The synthesis bank of claim 25, wherein the inverse transform has n stages and wherein:

the second processing unit is configured and arranged to generate high and low outputs;

the first plurality of register banks includes n register banks, wherein register banks 1 through (n−1) of the first plurality of register banks are coupled to receive low output signals from the second processing unit; and register bank n of the first plurality of register banks is arranged to receive the input data.

* * * * *